(12) United States Patent
Hilton et al.

(10) Patent No.: US 10,558,806 B2
(45) Date of Patent: Feb. 11, 2020

(54) APPLICATION-LEVEL SIGNAL HANDLING AND APPLICATION-LEVEL MEMORY PROTECTION

(71) Applicant: International Business Machines Corporation, Armonk, NY (US)

(72) Inventors: Andrew D. Hilton, Durham, NC (US); Brian M. Rogers, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 15/376,828

(22) Filed: Dec. 13, 2016

(65) Prior Publication Data

US 2017/0103207 A1    Apr. 13, 2017

Related U.S. Application Data

(62) Division of application No. 14/446,822, filed on Jul. 30, 2014, now Pat. No. 9,542,254.

(51) Int. Cl.
*G06F 11/00* (2006.01)
*G06F 21/57* (2013.01)
(Continued)

(52) U.S. Cl.
CPC ............ *G06F 21/57* (2013.01); *G06F 9/4812* (2013.01); *G06F 11/073* (2013.01);
(Continued)

(58) Field of Classification Search
CPC ...... G06F 21/57; G06F 21/577; G06F 9/4812; G06F 11/0706; G06F 11/073; G06F 11/0751; G06F 11/0772; G06F 11/0784; G06F 11/0793; G06F 11/3037; G06F 12/145; G06F 9/00; G06F 2221/034; G06F 11/3466; G06F 11/3417; G06F 11/3476; G06F 11/348; G06F 11/3485;
(Continued)

(56) References Cited

U.S. PATENT DOCUMENTS 5,305,455 A    4/1994 Anschuetz et al.
5,740,413 A *  4/1998 Alpert ................. G06F 11/3664
                                             712/227

(Continued)

FOREIGN PATENT DOCUMENTS

GB    1344474    1/1974

OTHER PUBLICATIONS

Notice of allowance for U.S. Appl. No. 14/446,822 dated Sep. 8, 2016, 9 pp.

*Primary Examiner* — Sarai E Butler
(74) *Attorney, Agent, or Firm* — Donald J. O'Brien (57) ABSTRACT

A processor receives a signal and determines whether an application has registered a signal handler therewith for handling the signal. In response to determining that the application has registered the signal handler, the processor transmits the signal directly to the signal handler of the application for handling the signal, without an operating system in relation to which the trusted application is running intervening. In response to determining that the trusted application has not registered the signal handler, the processor transmits the signal to a signal handler of the operating system for handling the signal.

12 Claims, 3 Drawing Sheets

(51) Int. Cl.
  *G06F 11/07*   (2006.01)
  *G06F 11/30*   (2006.01)
  *G06F 9/48*    (2006.01)
  *G06F 12/14*   (2006.01)
  *G06F 9/00*    (2006.01)

(52) U.S. Cl.
  CPC ...... *G06F 11/0706* (2013.01); *G06F 11/0751* (2013.01); *G06F 11/0772* (2013.01); *G06F 11/0784* (2013.01); *G06F 11/0793* (2013.01); *G06F 11/3037* (2013.01); *G06F 12/145* (2013.01); *G06F 21/577* (2013.01); *G06F 9/00* (2013.01); *G06F 2221/034* (2013.01)

(58) Field of Classification Search
  CPC ............... G06F 11/349; G06F 11/3495; G06F 11/3636; G06F 11/364
  USPC .................................................... 714/25, 45
  See application file for complete search history.

(56) References Cited

U.S. PATENT DOCUMENTS

| | | | |
|---|---|---|---|
| 6,334,193 B1 | 12/2001 | Buzsaki | |
| 7,395,394 B2 | 7/2008 | Federa et al. | |
| 8,146,106 B2 | 3/2012 | Kim et al. | |
| 8,255,603 B2 | 8/2012 | Chung et al. | |
| 8,683,114 B2 | 3/2014 | Zbiciak et al. | |
| 8,996,796 B1 | 3/2015 | Karamcheti et al. | |
| 2002/0112203 A1 | 8/2002 | Andress et al. | |
| 2004/0187117 A1* | 9/2004 | Orion | G06F 9/4812 718/100 |
| 2005/0268058 A1* | 12/2005 | Drasnin | G06F 12/1425 711/163 |
| 2007/0156951 A1 | 7/2007 | Sultan et al. | |
| 2007/0198997 A1* | 8/2007 | Jacops | G06F 8/36 719/328 |
| 2008/0148259 A1 | 6/2008 | Hankins et al. | |
| 2010/0031325 A1* | 2/2010 | Maigne | G06F 9/45533 726/4 |
| 2010/0218169 A1* | 8/2010 | Andersen | G06F 11/0793 717/125 |
| 2010/0313061 A1* | 12/2010 | Huth | G06F 11/073 714/2 |
| 2014/0351472 A1* | 11/2014 | Jebson | G06F 13/24 710/269 |
| 2015/0205661 A1 | 7/2015 | Kaus et al. | |
| 2015/0212839 A1 | 7/2015 | Tsirkin | |
| 2015/0331812 A1 | 11/2015 | Horman | |
| 2016/0034689 A1 | 2/2016 | Hilton et al. | |

\* cited by examiner

FIG 3

APPLICATION-LEVEL SIGNAL HANDLING AND APPLICATION-LEVEL MEMORY PROTECTION

BACKGROUND

Signals within computing systems are generated by, communicated between, and handled by (i.e., processed by) multiple different software and hardware components. Hardware or software may generate the signals. The signals may be transmitted to appropriate software handlers in one type of memory, such as kernel space, and then transmitted to other software handlers in another type of memory, such as user space. The former and latter software handlers may communicate back and forth multiple times to handle some types of signals. Signals can include hardware-generated exceptions and interrupts, as well as software-generated interrupts.

SUMMARY

An example method includes receiving a signal, by a trusted processor. The method includes determining, by the trusted processor, whether a trusted application has registered a signal handler therewith for handling the signal. The method includes, in response to determining that the trusted application has registered the signal handler, transmitting the signal directly to the signal handler of the trusted application for handling the signal, by the trusted processor, without an untrusted operating system in relation to which the trusted application is running intervening. The method includes, in response to determining that the trusted application has not registered the signal handler, transmitting the signal to a signal handler of the untrusted operating system for handling the signal, by the trusted processor.

Another example method includes generating a memory fault, by a processor, the memory fault related to memory and caused by a memory operation exceeding a memory restriction placed on the memory. The method includes determining, by the processor, whether an application previously registered memory protection for the memory to which the memory fault relates with the processor. The method includes in response to determining that the application previously registered the memory protection for the memory, transmitting the memory fault directly to a memory fault handler of the application for handing the memory fault, without an operating system in relation to which the application is running intervening. The method includes, in response to determining that the application did not previously register the memory protection for the memory, transmitting the memory fault to a memory fault handler of the operating system for handling the memory fault.

An example processor for a system includes a first register to store a vector having a plurality of bits corresponding to a plurality of different signal types. Each bit corresponds to whether an application-level signal handler has been registered for receiving signals of the corresponding signal type directly without intervention by an operating system. The processor includes a second register to store memory pointers to the application-level signal handlers that have been registered. The processor includes a memory to store for each of a plurality of memory blocks of the system an application-level memory restriction of the memory block, where one of the different signal types is a memory fault. The processor includes a processing core to process signals of the different signal types in accordance with the bits of the vector within the first register and in accordance with the memory pointers within the second register, and to process memory operations in accordance with at least the application-memory restrictions within the memory.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, hardware and software within a computing system work in concert to handle signals. For example, a signal may be generated by hardware, and routed to an operating system for handling. The operating system may in turn pass the signal to an application program for handling. The application program and the operating system may communicate back and forth several times until such handling has been completed.

There are at least two drawbacks to such existing signal processing techniques. A first drawback is security related. Historically, operating systems may have been considered trusted, and application programs untrusted. However, with the advent of cloud computing and other types of architectures, the application programs may be trusted and may be running on trusted processors, but the operating systems in relation to which the trusted applications are running may be untrusted.

Trustworthiness in this context means whether it can be assumed that given software, such as an operating system or an application program, is not malicious. Trusted software is assumed to not present any security risks. By comparison, untrusted software cannot be guaranteed to not present any security risks.

Therefore, when a signal is received by a processor, such as a trusted processor, having it transmit the signal to an untrusted operating system first, as is conventional, can be problematic. Application programs can register with operating systems as to the types of signals they would prefer to handle, and it is up to the operating systems in these situations to properly transmit the signals to the applications for handling. However, if the operating system is untrusted, it may modify the signal, not send the signal, or in possibly the worst case, modify the application program, when calling the application to handle the signal.

A second drawback to existing signal processing techniques is performance related. Operating systems usually reside in a portion of memory that is known as kernel space, whereas application programs usually reside in a portion of memory that is known as user space. Kernel space and user space are protected from one another typically, and switching execution from one space to the other incurs a performance penalty. Therefore, when signal handling requires multiple changes in execution context between kernel space and user space, performance can suffer.

Techniques disclosed herein alleviate these drawbacks. As to security and performance, a trusted application can register a signal handler directly with a trusted processor. When the signal is received by the trusted processor, the processor transmits the signal directly to the signal handler of the application, without an untrusted operating system intervening first. That is, the signal is not transmitted to the operating system, at least at first. This ensures that an untrusted operating system that is indeed nefarious cannot maliciously present an attack vector against the application via signal handling.

As to performance, some types of signals are intended for specific applications. For example, in the context of garbage collection with respect to memory, an application performing its own garbage collection to release previously allocated memory so that this memory can again be allocated may nevertheless have to rely upon a processor's system-wide memory protection capabilities. This means that to place restrictions on and remove restrictions from memory, the application has to interact with an operating system. As noted above, each transition between user space and kernel space incurs a performance penalty, however.

Therefore, the techniques disclosed herein permit application-level memory restrictions to be placed on memory that minimize transition to kernel space, in addition to more traditional system-level memory restrictions that do not. When a memory fault, which is a type of signal, is generated, a processor can transmit the memory fault directly to the memory fault handler of an application that previously registered a corresponding memory restriction with the processor. Operating system intervention is minimized or eliminated, insofar as applications can place their own memory restrictions on memory apart from those that the operating systems can.

Figure 1:
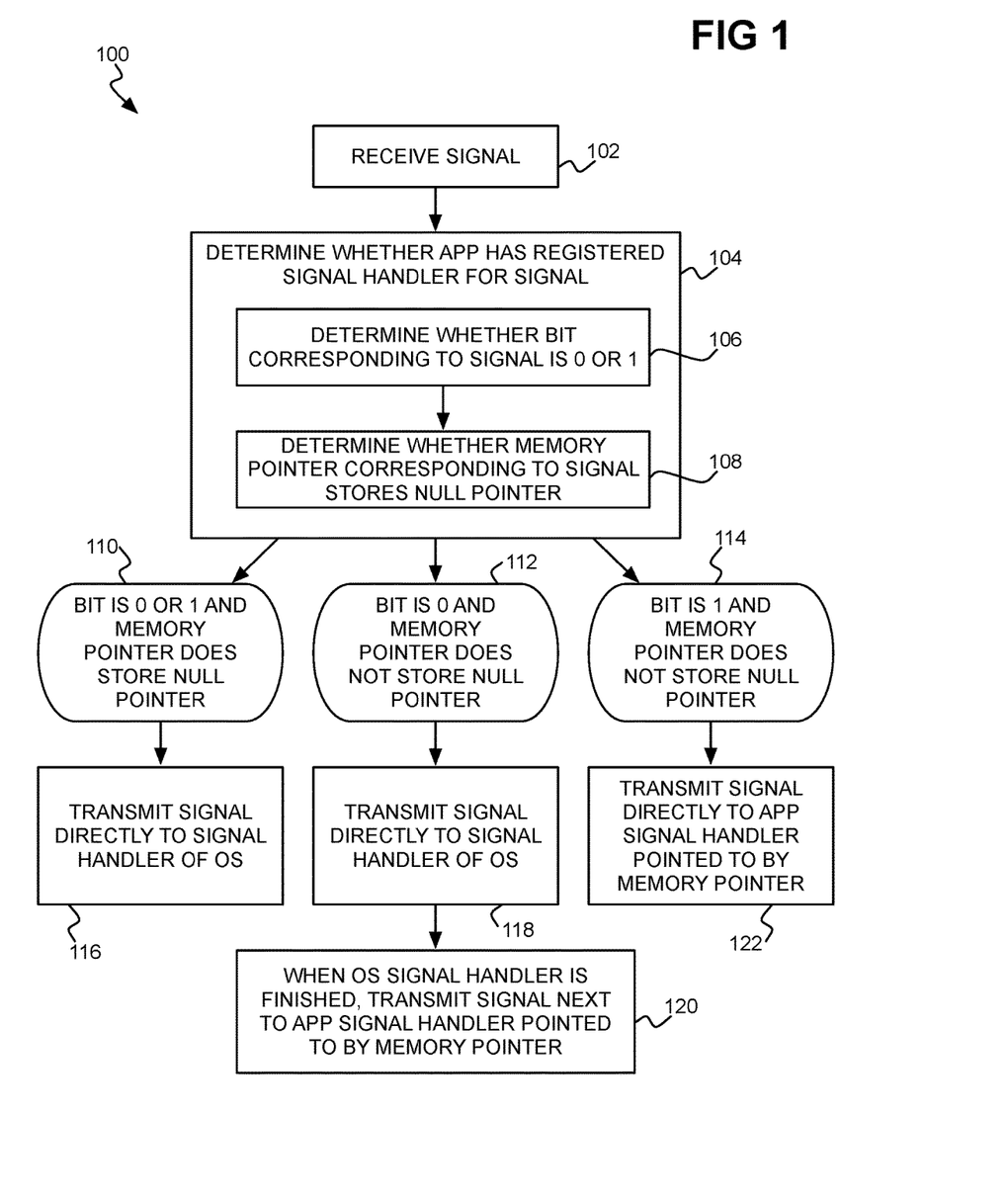
FIG. 1 is a flowchart of an example method for routing signals to signal handlers by a processor.

FIG. 1 shows an example method 100 for routing signals to signal handlers by a processor. The processor can be a trusted processor, which is a type of trusted hardware that is not expected to be malicious. More generally, the processor can be a central processing unit (CPU) of a computing system, like a desktop or laptop computer or other type of computing device.

The processor receives a signal (102). The signal may be a hardware-generated exception or interrupt raised by the processor or other hardware due to an error or fault occurring in execution of an application. The application is an application that can register a signal handler to handle the signal, and may be a trusted application. The signal may be a hardware-generated interrupt raised by the processor or other hardware due to an event that was previously programmed by the application. The signal may be a software-generated interrupt raised by another application, such as through an operating system that itself has a signal handler to handle the signal. The operating system may be an untrusted operating system.

Examples of signals include the following. The application may have registered that signals of various types be generated when certain events occur. Examples of such signals include memory access exceptions, which are triggered when there has been read and/or write access to a given portion of memory. The application may have setup timers that upon elapsing cause corresponding signals to be generated. Examples of such timers include those that provide bounded waits on system calls, and threading library switching between user space and kernel space. Another application may have initiated a signal. An example of such a signal is the termination of a process via a kill command, or a system daemon that requires an application to reread its configuration file.

Upon receiving the signal, the processor determines whether an application has registered a signal handler for the signal (104). This can be achieved in two parts. The processor determines whether a bit corresponding to the signal is zero or one (106). A zero bit (more generally, a bit of a first value) equates to the signal handler of the operating system first handling the signal, and a signal handler of the application—if present—subsequently handling the signal. A one bit (more generally, a bit of a second value) equates to the signal handler of the application exclusively handling the signal, so long as there is such a signal handler.

The processor also determines whether a memory pointer corresponding to the signal stores a null pointer (108). A non-null pointer means the application has registered with the processor that it wishes to have its signal handler handle the signal, either exclusively (where the application has previously requested that the bit be set to one) or after the operating system has handled the signal (where the application has not previously requested that the bit be set to one, or has requested that the bit be set to zero). The non-null pointer is the address of the application's signal handler as previously provided by the application. A null pointer means the application either has not registered with the processor that it wishes to have its signal handler handle the signal, or has so registered but has not yet provided the address of its signal handler.

There are thus three cases: the memory pointer storing the null pointer regardless of whether the bit is zero or one (110); the memory pointer storing a non-null pointer and the bit being zero (112); and the memory pointer storing a non-null pointer and the bit being one (114). In the first case (110), the processor transmits the signal directly to the signal handler of the operating system (116). The application program does not process the signal at all in this case. In the second case (112), the processor first transmits the signal to the signal handler of the operating system (118), and when the operating system is finished processing the signal, then transmits the signal to the signal handler of the application (120). The latter is achieved by calling the address of the signal handler of the application referenced by the memory pointer.

In the third case (114), the processor transmits the signal directly to the application signal handler pointed to by the memory pointer (122), such that the operating system in relation to which the application is running never intervenes in the signal processing. The third case therefore provides for maximum security in signal handling. If the processor and the application are trusted but the operating system is untrusted, for instance, the third case—when the bit is one and the memory pointer is non-null—provides for signal handling without involving the operating system.

Figure 2:
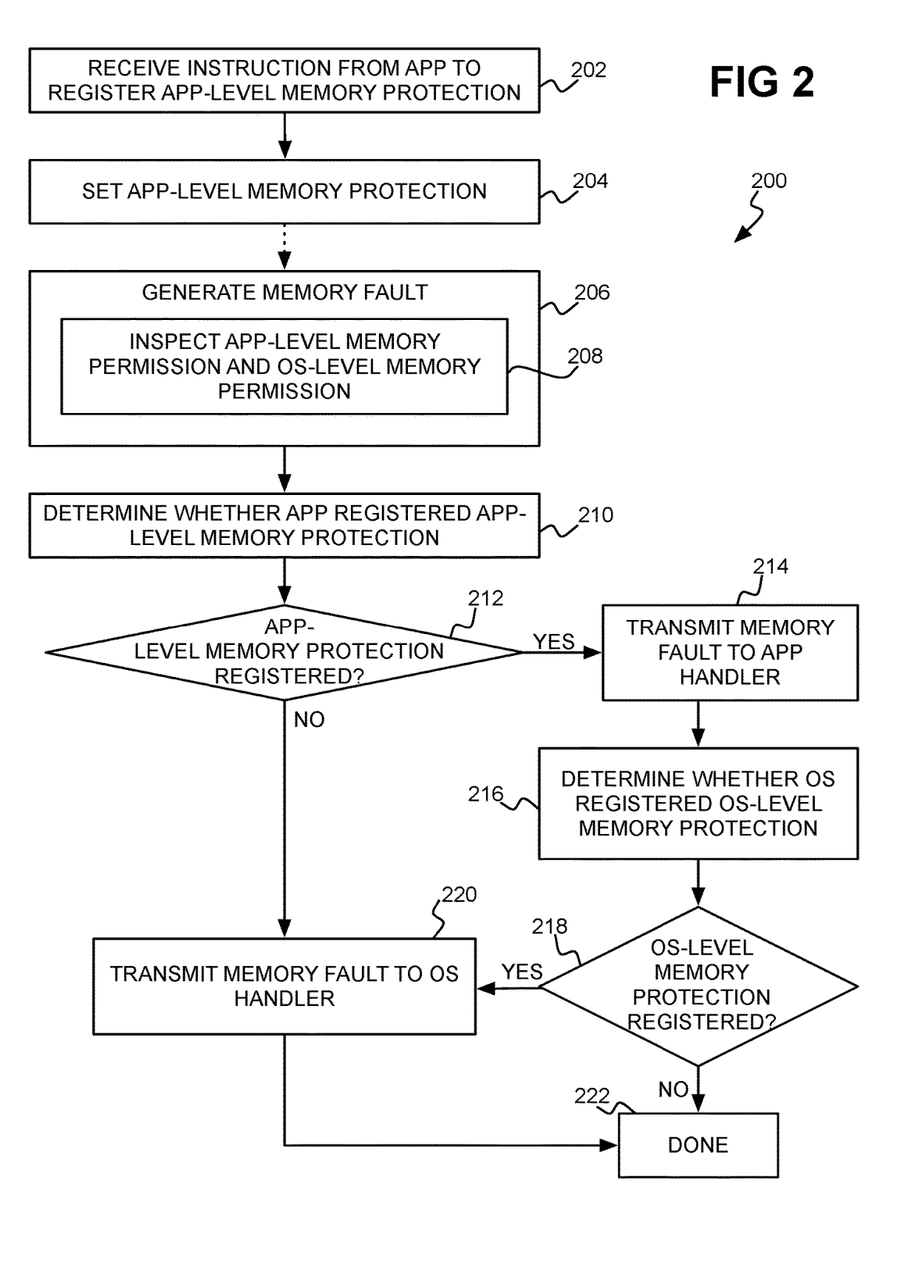
FIG. 2 is a flowchart of an example method for routing signals that are memory faults to signal handlers that are memory fault handlers, by a processor.

FIG. 2 shows an example method 200 that is consistent with but more specific than the method 100. The method 200 particularly applies to signals that are memory faults, and to signal handlers that are memory fault handlers. Like the method 100, the method 200 is performed by a processor, such as a trusted processor. The method 200 provides for application-only or application-first memory fault handling, which can serve to decrease the number of transitions between user space and kernel space in garbage collection and potentially other contexts, thus improving performance.

At first, the processor receives an instruction from an application to register memory protection for memory with the processor (202), in accordance with which the processor then sets the memory protection. The memory protection registered by the application is application-level memory protection, apart from more system-wide memory protection that may also be able to be set. The memory protection can be specified on a memory page basis, for instance, such that different memory protection can be specified for each memory page of addressable memory.

The memory protection may specify read-only permission, write-only permission, or execution-only permission of the memory in question. Read-only permission is such that writing data to the memory or executing code from the memory triggers a memory fault; that is, only reading data from the memory is permitted. Write-only permission is such that reading data from the memory or executing code from the memory triggers a memory fault; that is, only writing (including updating) data to the memory is permitted. Execution-only permission is such that reading data from or writing data to the memory triggers a memory fault; that is, only executing code from the memory is permitted.

Once the memory protection has been registered for the memory by the application, subsequent prohibited access to the memory (i.e., access exceeding the memory restriction(s) on the memory that are in place) results in the processor generating a memory fault (206). For instance, the processor may inspect both an application-level memory protection and an operating system-level (i.e., system-wide) memory protection for the memory (208). The memory fault may be triggered by access that is restricted by a memory restriction in accordance with either or both memory protections. If the application-level memory protection provides or dictates the memory restriction, then it can be concluded that the application previously registered the memory protection for the memory. If additionally or alternatively the operating system-level memory protection provides or dictates the memory restriction, then it can be concluded that the operating system previously directly or indirectly registered the memory protection for the memory.

Therefore, it can be said that the processor determines whether the application previously registered an application-level memory protection for the memory in question that resulted in the generated memory fault, consistent with parts 206 and 208 (210). If the application did previously register the application-level memory protection (212)—that is, the memory restriction that caused the memory fault resulted from the application-level memory protection—then the processor transmits the memory fault directly to the memory fault handler of the application for handling the memory fault (214). The operating system in relation to which the application is running does not intervene in this transmission. For instance, the processor does not transmit the memory fault to the operating system for transmission to the application.

Once the application has finished handling the memory fault, the processor then determines whether the operating system also previously registered an operating system-level memory protection for the memory in question that may also have resulted in the generated memory fault, consistent with parts 206 and 208 (216). If the operating system also did previously register the operating system-level memory protection (218), then the processor then transmits the memory fault to the operating system for the memory fault handler thereof to handle the memory fault, too (220). If not, then the method 200 is finished (222).

If the application did not previously register the application-level memory protection (212), however, then this means that the memory fault was generated as a result of an operating system-level memory protection. Therefore, in this case, the processor transmits the memory fault to the memory fault handler of the operating system to handle the memory fault (220), before finishing (222). Thus, the operating system handles a memory fault either after the application handles the memory fault where part 220 is proceeded to from part 218, or solely handles the memory fault, where part 220 is proceeded to from part 212.

Therefore, in the method 200, there are three scenarios when a memory fault is generated. First, there may be both an application-level memory protection and an operating system-level memory protection previously registered for the memory in question, in which case the application's handler processes the memory fault before the operating system's handler does. Second, there may be just an application-level memory protection in place, in which case just the application's handler processes the memory fault. Third, there may be just an operating system-level memory protection in place, in which case just the operating system's handler processes the memory fault.

Figure 3:
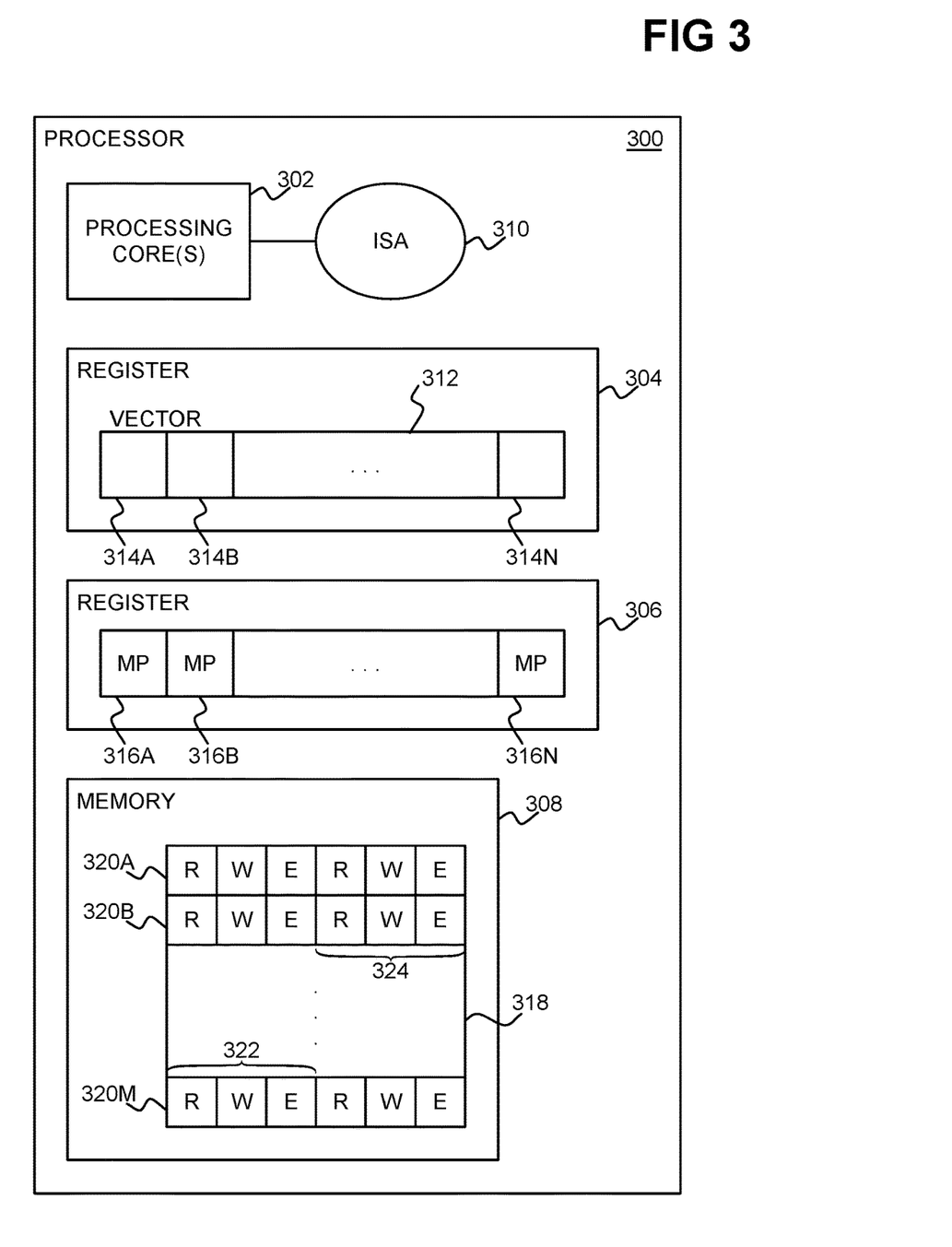
FIG. 3 is a diagram of an example processor that can perform the method of FIG. 1 and/or of FIG. 2.

FIG. 3 shows an example processor 300. The processor 300 can be the processor 300 that performs the method 100 and 200. The processor 300 includes at least one or more processing cores 302, registers 304 and 306, and a memory 308. The processor 300 can include other components, in addition to those depicted in FIG. 3.

The processor cores 302 are the portions of the processor 300 that execute instructions in accordance with an associated instruction set architecture 310 to execute computer-executable code of computer programs, such as applications, operating systems, and so on. The instruction set architecture 310 specifies the instructions that are understandable by the processor cores 302. Computer-executable code is written using these instructions, which are said to be called or executed by the processor cores 302.

The registers 304 and 306 may be special purpose registers, or other types of registers. The register 304 stores a vector 312 including bits 314A, 314B, . . . , 314N, collectively referred to as the bits 314. Each bit 314 corresponds to a different type of signal, such as a different type of interrupt or exception, for which an application can register an application-level signal handler via calling an instruction of the instruction set architecture 310. The bit values in question may be those that have been described in relation to the method 100. As an example, where there are four bits 314, the corresponding signal types may be application permissions page fault, timer exception, external software signal, and a divided-by zero fault.

The register 306 stores memory pointers 316A, 316B, . . . , 316N, collectively referred to as the memory pointers 316. The number of memory pointers 316 is equal to the number of bits 314, and each bit 314 corresponds to one of the memory pointers 316. Each memory pointer 316 stores a pointer to (i.e., the memory location of) an application-level signal handler that has been registered by an application; the application may specify the signal handler in question by calling an instruction of the instruction set architecture 310. Alternatively, each memory pointer 316 may store a null value.

For example, for a signal type for which an application has not registered to handle, the corresponding bit 314 may be zero, and the corresponding memory pointer 316 may be null. If an application has registered to exclusively handle the signal type, but has not yet provided the location of its signal handler, then the corresponding bit 314 may be one, and the corresponding memory pointer 316 may still be null. These two cases correspond to 110 of FIG. 1. If an application has registered to non-exclusively handle the signal type and has provided the location of its signal handler, then the corresponding bit 314 may be zero, and the corresponding memory pointer 316 may be non-null, corresponding to 112 of FIG. 1. If an application has registered to exclusively handle the signal type and has provided its signal handler's location, then the corresponding bit 314 may be one, and the corresponding memory pointer 316 may be non-null, corresponding to 114 of FIG. 1.

The memory 308 is depicted in FIG. 3 as being internal to the processor 300, but may in some implementations be external thereto. The memory 308 stores a memory block table 318, having a number of entries 320A, 320B, . . . , 320M, collectively referred to as the entries 320, which correspond to the memory blocks at the most granular level of which memory restrictions can be placed thereon. The memory blocks may be memory pages, for instance, such that the table 318 is a page table. It is noted that the number of entries 320 is independent of the number of bits 314 or the number of pointers 316; the fact that the last entry 320M has a letter preceding the letter of the last bit 314M and the last pointer 316M is coincidental.

Each entry 320 of the memory block table 318 corresponds to a different block of memory, and stores three application-level restriction bits 322 and three operating system-level (or, system-wide) restriction bits 324. There are application-level restriction bits 322R, 322W, and 322E for each entry 320, corresponding to read-only, write-only, and execution-only restrictions, respectively, on memory locations within the corresponding memory block. Likewise, there are operating system-level restriction bits 324R, 324W, and 324E for each entry 320, corresponding to read-only, write-only, and execution-only restrictions, respectively, on memory locations within the corresponding memory block. An application programs an application-level memory restriction by calling an appropriate instruction of the instruction set architecture 310, as do operating systems for operating system-level memory restrictions.

The processing cores 302 therefore process signals of the different signal types in accordance with the bits 314 of the vector 312 and in accordance with the memory pointers 316, as described in the method 100. The processing cores 302 process memory operations in accordance with the memory restrictions specified by the entries 320 of the memory block table 318. For example, for a read, write, or execute operation associated with a particular memory block, the corresponding application-level read, write, or execution bit 322 and the corresponding operating system level read, write, or execution bit 324 can be subjected to a logic operation to determine if a memory fault is to be generated. If so, then the memory fault handler of an application and/or the memory fault handler of an operating system is called depending on which bit 322 or 324 (or both) has been set.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

We claim:

1. A method comprising:
receiving a signal, by a trusted processor;
determining, by the trusted processor, whether a trusted application has registered a signal handler of the trusted application, therewith for handling the signal;
in response to determining that the trusted application has registered the signal handler of the trusted application, transmitting the signal directly to the signal handler of the trusted application for handling the signal, by the trusted processor, without an untrusted operating system in relation to which the trusted application is running intervening; and
in response to determining that the trusted application has not registered the signal handler of the trusted application, transmitting the signal to a signal handler of the untrusted operating system for handling the signal, by the trusted processor, wherein determining whether the trusted application has registered the signal handler of the trusted application therewith for handling the signal comprises:
looking up a memory pointer within a register of the trusted processor corresponding to the signal;
determining whether the memory pointer stores a null pointer;
in response to determining that the memory pointer does not store the null pointer, determining that the trusted application has registered the signal handler of the trusted application therewith for handling the signal, and wherein transmitting the signal to the signal handler of the trusted application for handling the signal comprises proceeding to transmit the signal directly to the signal handler of the trusted application by calling an address of the trusted application to which the memory pointer refers.

2. The method of claim 1, wherein determining whether the trusted application has registered the signal handler of the trusted application therewith for handling the signal comprises:
determining whether a registration of the signal handler of the trusted application specifies that the signal handler of the untrusted operating system is to handle the signal before the signal handler of the trusted application is, and wherein the method further comprises:
in response to determining that the registration specifies that the signal handler of the untrusted operating system is to handle the signal before the signal handler of the trusted application is, transmitting the signal to the signal handler of the untrusted operating system for handling the signal and thereafter transmitting the signal to the signal handler of the trusted application for handling the signal; and
in response to determining that the registration does not specify that the signal handler of the untrusted operating system is to handle the signal before the signal handler of the trusted application is, proceeding to transmit the signal directly to the signal handler of the trusted application for handling the signal.

3. The method of claim 2, wherein determining whether the registration of the signal handler of the trusted application specifies that the signal handler of the untrusted operating system is to handle the signal before the signal handler of the trusted application is comprises:
  determining that the registration of the signal handler of the trusted application specifies that the signal handler of the untrusted operating system is to handle the signal before the signal handler of the trusted application where a bit corresponding to the signal has been set to a first value corresponding to the signal handler of the untrusted operating system to handle the signal before the signal handler of the trusted application; and
  determining that the registration of the signal handler does not specify that the signal handler of the untrusted operating system is to handle the signal before the signal handler of the trusted application where the bit has been set to a second value corresponding to the signal handler of the trusted application to handle the signal without the signal handler of the untrusted operating system receiving the signal for handling first.

4. The method of claim 3, wherein the bit is one of a plurality of bits of a vector stored in the register of the trusted processor, each bit of the vector corresponding to a different signal.

5. The method of claim 1, determining whether the trusted application has registered the signal handler of the trusted application therewith for handling the signal further comprises:
  in response to determining that the memory pointer stores the null pointer, determining that the trusted application has not registered the signal handler of the trusted application therewith for handling the signal,
  and wherein transmitting the signal to the signal handler of the untrusted operating system for handling the signal comprises proceeding processing to transmit the signal to the signal handler of the untrusted operating system for handling the signal.

6. The method of claim 1, wherein the signal comprises one of:
  a hardware-generated exception or interrupt raised by the trusted processor or other hardware due to an error or fault in execution of the trusted application;
  a hardware-generated interrupt raised by the trusted processor or the other hardware due to an event previously programmed by the trusted application;
  a software-generated interrupt raised by another application through the untrusted operating system.

7. A method comprising:
  receiving a signal, by a trusted processor;
  determining, by the trusted processor, whether a trusted application has registered a signal handler of the trusted application therewith for handling the signal;
  in response to determining that the trusted application has registered the signal handler of the trusted application, transmitting the signal directly to the signal handler of the trusted application for handling the signal, by the trusted processor, without an untrusted operating system, in relation to which the trusted application is running, intervening; and
  in response to determining that the trusted application has not registered the signal handler of the trusted application, transmitting the signal to a signal handler of the untrusted operating system for handling the signal, by the trusted processor, wherein determining whether the trusted application has registered the signal handler of the trusted application therewith for handling the signal, transmitting the signal directly to the signal handler of the trusted application, and transmitting the signal to the signal handler of the untrusted operating system comprise:
  in response to determining that a memory pointer within a register of the trusted processor corresponding to the signal references an address of the trusted application, transmitting the signal directly to the signal handler of the trusted application by calling the address; and
  in response to determining that the memory pointer does not reference the address of the trusted application, transmitting the signal to the signal handler of the untrusted operating system.

8. The method of claim 7, wherein determining whether the trusted application has registered the signal handler of the trusted application therewith for handling the signal comprises:
  determining whether a registration of the signal handler of the trusted application specifies that the signal handler of the untrusted operating system is to handle the signal before the signal handler of the trusted application is, and wherein the method further comprises:
  in response to determining that the registration specifies that the signal handler of the untrusted operating system is to handle the signal before the signal handler of the trusted application is, transmitting the signal to the signal handler of the untrusted operating system for handling the signal and thereafter transmitting the signal to the signal handler of the trusted application for handling the signal; and
  in response to determining that the registration does not specify that the signal handler of the untrusted operating system is to handle the signal before the signal handler of the trusted application is, proceeding to transmit the signal directly to the signal handler of the trusted application for handling the signal.

9. The method of claim 8, wherein determining whether the registration of the signal handler of the trusted application specifies that the signal handler of the untrusted operating system is to handle the signal before the signal handler of the trusted application is comprises:
  determining that the registration of the signal handler of the trusted application specifies that the signal handler of the untrusted operating system is to handle the signal before the signal handler of the trusted application where a bit corresponding to the signal has been set to a first value corresponding to the signal handler of the untrusted operating system to handle the signal before the signal handler of the trusted application; and
  determining that the registration of the signal handler does not specify that the signal handler of the untrusted operating system is to handle the signal before the signal handler of the trusted application where the bit has been set to a second value corresponding to the signal handler of the trusted application to handle the signal without the signal handler of the untrusted operating system receiving the signal for handling first.

10. The method of claim 9, wherein the bit is one of a plurality of bits of a vector stored in the register of the trusted processor, each bit of the vector corresponding to a different signal.

11. The method of claim 7, wherein determining whether the trusted application has registered the signal handler of the trusted application therewith for handling the signal further comprises: in response to determining that the memory pointer stores a null pointer, determining that the trusted application has not registered the signal handler of the trusted application therewith for handling the signal, and wherein transmitting the signal to the signal handler of the untrusted operating system for handling the signal comprises proceeding processing to transmit the signal to the signal handler of the untrusted operating system for handling the signal.

12. The method of claim 7, wherein the signal comprises one of:
- a hardware-generated exception or interrupt raised by the trusted processor or other hardware due to an error or fault in execution of the trusted application;
- a hardware-generated interrupt raised by the trusted processor or the other hardware due to an event previously programmed by the trusted application;
- a software-generated interrupt raised by another application through the untrusted operating system.

* * * * *